L. H. DESJARDINS.
DISH WASHER.
APPLICATION FILED JUNE 25, 1907.
937,363.
Patented Oct. 19, 1909.
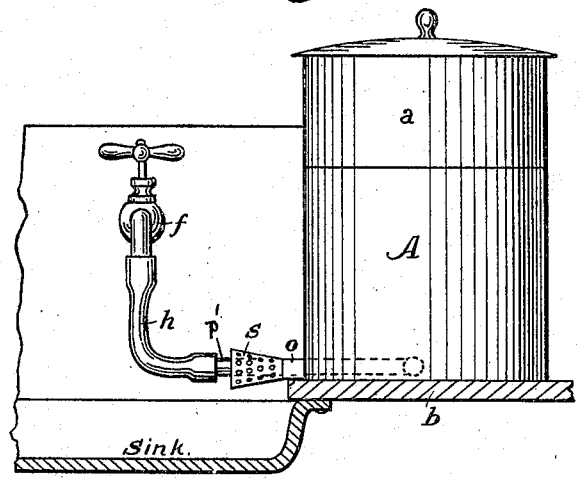
Fig. 1.
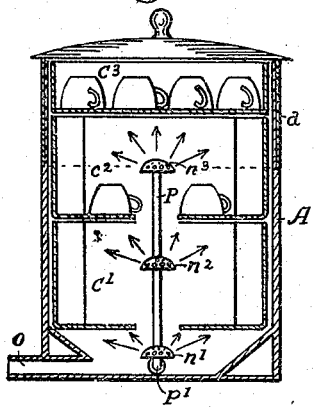
Fig. 2.
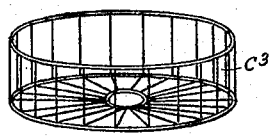
Fig. 3.
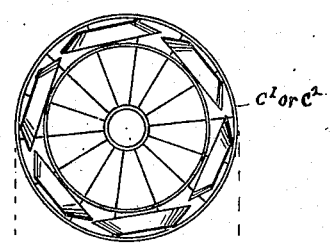
Fig. 4.
Fig. 5.
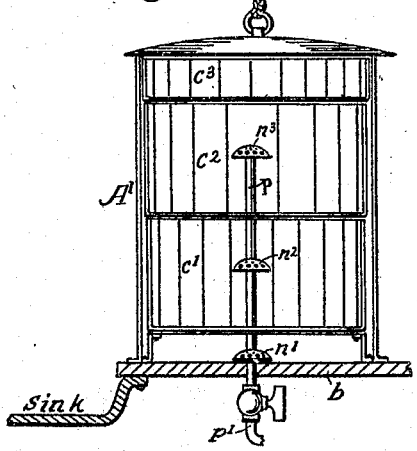
Fig. 6.
WITNESSES:
Joseph R. Gardner
Esther Wilmer
INVENTOR.
Louise Hosea Desjardins
BY Walter A. Knight
ATTORNEY.

UNITED STATES PATENT OFFICE.

LOUISE HOSEA DESJARDINS, OF CINCINNATI, OHIO.

DISH-WASHER.

937,363.

Specification of Letters Patent.

Patented Oct. 19, 1909.

Application filed June 25, 1907. Serial No. 380,739.

*To all whom it may concern:*

Be it known that I, LOUISE HOSEA DESJARDINS, a citizen of the United States, residing at Cincinnati, in the county of Hamilton and State of Ohio, have invented new and useful Improvements in Dish-Washers, of which the following is a specification.

My invention relates to automatic dish-washing apparatus; its object being to produce a simple, compact and efficient apparatus adapted to household use, for the automatic cleansing of table dishes.

To this end, it consists in a holding vessel designed to rest on a drain board of a kitchen sink or other support, provided with a central stand pipe with "rose nozzles" and a series of removable foraminous dish holders, (as hereinafter described), and with means for connecting the same with a source of hot water supply under sufficient pressure to be discharged in jets or sprays against dishes suitably disposed in the dish holders; also in a dish holder of peculiar form and construction; all as hereinafter set forth.

Referring to the accompanying drawings illustrating a form of my invention which I have found most convenient for household use:—Figure 1, is a general elevation of the dish washer as connected for use. Fig. 2, a vertical cross-section of the apparatus. Fig. 3, a perspective elevation of the upper dish-holder, and Figs. 4 and 5, a plan and corresponding elevation of the two lower dish-holders. Fig. 6, an elevation of a variation of structure.

The containing vessel is a cylindrical casing A, of sheet metal, closed below and open above, provided with a removable cover $a$. The vessel is provided with an outlet $o$, at the bottom, and, preferably, with a removable strainer $s$, used in connection therewith. When in use the vessel is conveniently supported, as indicated in Fig. 1, on the drain board $b$, of the kitchen sink, and connected for its water supply by the hose $h$, to the ordinary hot water faucet $f$; and the outlet $o$ (provided with the removable strainer $s$) discharges directly into the sink.

The essential operative principle of the apparatus or device is the discharge of hot water in numerous fine jets or sprays against dishes suitably disposed to receive the same in a closed containing vessel. The dishes receive also the added cleansing effect of the steam or vapor. To secure this result in a simple and effective manner, I provide the vessel A with a stand-pipe, $p$, secured to the bottom and rising in the axis of the vessel to a convenient height, provided with rose nozzles $n^1$, $n^2$, $n^3$, and with a supply connection $p^1$ extending outwardly to receive the detachable hose $h$. The rose nozzles $n^1$, $n^2$ and $n^3$ are arranged to discharge upwardly and outwardly as indicated by the arrows in Fig. 2.

The dishes to be cleansed are contained in removable dish-holders $c^1$, $c^2$, and $c^3$ placed in superimposed series within the vessel A. These are shallow cylindrical form as indicated in Figs. 3 and 5; and are preferably constructed of wire with large open meshes. The upper one $c^3$ may be a shallow basket with flat bottom, while the two lower ones $c^1$ and $c^2$ are of greater depth, each having a double outer rim or wall bounding a concentric annular space or "gallery" in which plates and saucers are arranged in vertical planes as indicated in Fig. 4, while inverted cups, glasses, bowls, knives, forks, etc., may be placed on the flat bottom of the holders— as indicated in Fig. 2.

The dish-holders $c^1$ and $c^2$ are provided with central openings in the bottoms, and being placed one upon another as indicated in Fig. 2, pass over the stand-pipe $p$ and its rose nozzles when being placed in position from above. The holder $c^3$ rests on top of these entirely above the stand-pipe. In this position the rose nozzles stand below the bottoms of the dish-holders, respectively, so that the upward jets may enter any inverted cups or dishes.

The dish-holders being removable, may be "loaded" and the dishes arranged therein while on the dining table or elsewhere as may be convenient, and there placed in position, and removed afterward, each with its load for convenient disposition of the dishes.

I do not confine my invention to the details of construction of dish-holders and stand-pipe here shown. The latter may be made removable and passed through the cover $a$ from above downward, but for obvious reasons of simplicity and convenience I prefer the arrangement shown.

To operate the device, the dishes, etc. being duly loaded upon the dish-holders, the latter are placed in superimposed series as indicated, and the cover $a$ being placed in position, the rubber hose $h$ is attached to the faucet $p$ and a stream of hot water (the hotter the better) is set flowing. The action of the direct jets, indicated by the arrows, (Fig. 2) is sufficiently obvious; but these in turn are deflected and subdivided by striking opposing surfaces at various angles, and, together with the vapor, thoroughly cleans the dishes; the hot water reaching every part of the surfaces, dissolving and carrying off food particles, grease, etc., with the outflow from the containing vessel A. Food particles are caught in the strainer $s$ while the grease is carried with the hot water into the sink. After a few minutes the flow of water is stopped, the hose detached, and the casing A and contents may be set aside and allowed to remain with the cover $a$ removed, for the dishes to dry by their own heat without wiping; or the dish-holders can be removed and the dishes disposed of as may be desired. The perfection of the result will of course depend largely on the heat of the water used, and the forcing pressure applied to the jets. It will be apparent that two or more "sets" or series of such dish-holders may be provided and used alternately with the same containing casing A.

As a formal variation within the principle of my invention, the drain board of the sink may be provided with a permanent hot water connection entering through it from below; and the containing vessel made as an integral cover $A^1$ arranged to be let down from above, covering the stand-pipe and the dish-holders arranged in relation thereto as already described. The operation and result are the same; but this construction somewhat facilitates the use where a large number of dishes are to be cleansed in a short time. The arrangement is sufficiently indicated in Fig. 6.

I claim as my invention and desire to secure by Letters Patent of the United States.

A dish-washing apparatus consisting essentially of a containing casing, in combination with a series of removable foraminous dish-holders adapted to be contained therein, and a stand-pipe arranged in the axis of the casing provided with perforated nozzles discharging upward and radially outward, said dish-holders having bottom openings to permit them to slip over the nozzles, substantially as set forth.

In testimony whereof I have hereunto set my hand in presence of two subscribing witnesses.

LOUISE HOSEA DESJARDINS.

Witnesses:
LEWIS M. HOSEA,
JOSEPH R. GARDNER.